(12) United States Patent
Mizutani

(10) Patent No.: US 8,051,318 B2
(45) Date of Patent: Nov. 1, 2011

(54) METHOD AND APPARATUS FOR CONTROLLING POWER IN A BATTERY-POWERED ELECTRONIC DEVICE

(75) Inventor: Akihiko Mizutani, Zushi (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 558 days.

(21) Appl. No.: 12/211,868

(22) Filed: Sep. 17, 2008

(65) Prior Publication Data

US 2009/0094473 A1  Apr. 9, 2009

(30) Foreign Application Priority Data

Oct. 4, 2007  (JP) ................................. 2007-261373

(51) Int. Cl.
 G06F 1/00 (2006.01)
 G06F 1/26 (2006.01)
 G06F 1/32 (2006.01)
 G06F 11/30 (2006.01)
(52) U.S. Cl. .................... 713/340; 713/300; 713/320
(58) Field of Classification Search .............. 713/300, 713/310, 320, 324, 323, 330, 340
 See application file for complete search history.

(56) References Cited

U.S. PATENT DOCUMENTS 7,853,813 B2 *  12/2010  Lee ............................... 713/320
2004/0070511 A1 *  4/2004  Kim ........................... 340/636.1
2005/0055587 A1 *  3/2005  Lee ............................... 713/300
2005/0240786 A1 *  10/2005  Ranganathan ............... 713/320

FOREIGN PATENT DOCUMENTS

| JP | 05-233551 | 9/1993 |
| JP | 10-268987 | 10/1993 |
| JP | 05-324139 | 12/1993 |
| JP | 06-083491 | 3/1994 |
| JP | 10-187291 | 7/1998 |
| JP | 10-268987 | 10/1998 |
| JP | 05-307431 | 11/1998 |
| JP | 11-312029 | 11/1999 |
| JP | 2000-253142 | 9/2000 |
| JP | 2002-062955 | 2/2002 |
| JP | 2005-293519 | 10/2005 |
| JP | 2006-048630 | 2/2006 |

* cited by examiner

Primary Examiner — Thomas Lee
Assistant Examiner — Samantha Hoang
(74) Attorney, Agent, or Firm — Anthony P. Ng; Yudell Isidore Ng Russell PLLC

(57) ABSTRACT

A method for controlling power in a battery-powered electronic apparatus is disclosed. The electronic apparatus includes a battery, a detection unit and a power consumption estimation unit. The battery supplies electric power to each device within the electronic apparatus. The detection unit periodically detects total power consumption of the electronic apparatus and device information representing an operating state of each device within the electronic apparatus. The power consumption estimation unit estimates power consumption of the each device based on the detected total power consumption and the detected device information of each device.

6 Claims, 5 Drawing Sheets

METHOD AND APPARATUS FOR CONTROLLING POWER IN A BATTERY-POWERED ELECTRONIC DEVICE

PRIORITY CLAIM

The present application claims benefit of priority under 35 U.S.C. §§120, 365 to the previously filed Japanese Patent Application No. JP2007-261373 entitled, "Electronic apparatus, power control method for electronic apparatus and program to be executed by computer" with a priority date of Oct. 4, 2007, which is incorporated by reference herein.

BACKGROUND OF THE INVENTION

1. Technical Field

The present invention relates to power control in general, and in particular to a method for controlling power consumption in a battery-powered electronic device.

2. Description of Related Art

As more and more battery-powered electronic devices appear in the market each year, users also expect those electronic devices to be capable of being continuously powered by batteries for a longer time. Thus, many methods of lengthening the battery usage time for battery-powered electronic devices have been implemented. Most of those methods are accomplished by taking advantage of various power saving functions.

For example, one prior art relies on the determination of whether or not processing can be performed based on the remaining battery capacity and the power consumption. If the processing cannot be performed, a function having the lowest priority is selected as an alternative target function from the functions registered in a limited operation information, and a function using the same constitutional requirements as those of the alternative target function but requiring less power than that of the alternative target function is selected as an alternative function to replace the alternative target function registered in the limited operation information. The priority of the alternative function is also changed to a high value. Another prior art relies on a profile for each application such that power is supplied only to an apparatus according to a user's usage situation.

SUMMARY OF THE INVENTION

In accordance with a preferred embodiment of the present invention, an electronic apparatus includes a battery, a detection unit and a power consumption estimation unit. The battery supplies electric power to each device within the electronic apparatus. The detection unit periodically detects total power consumption of the electronic apparatus and device information representing an operating state of each device within the electronic apparatus. The power consumption estimation unit estimates power consumption of the each device based on the detected total power consumption and the detected device information of each device.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
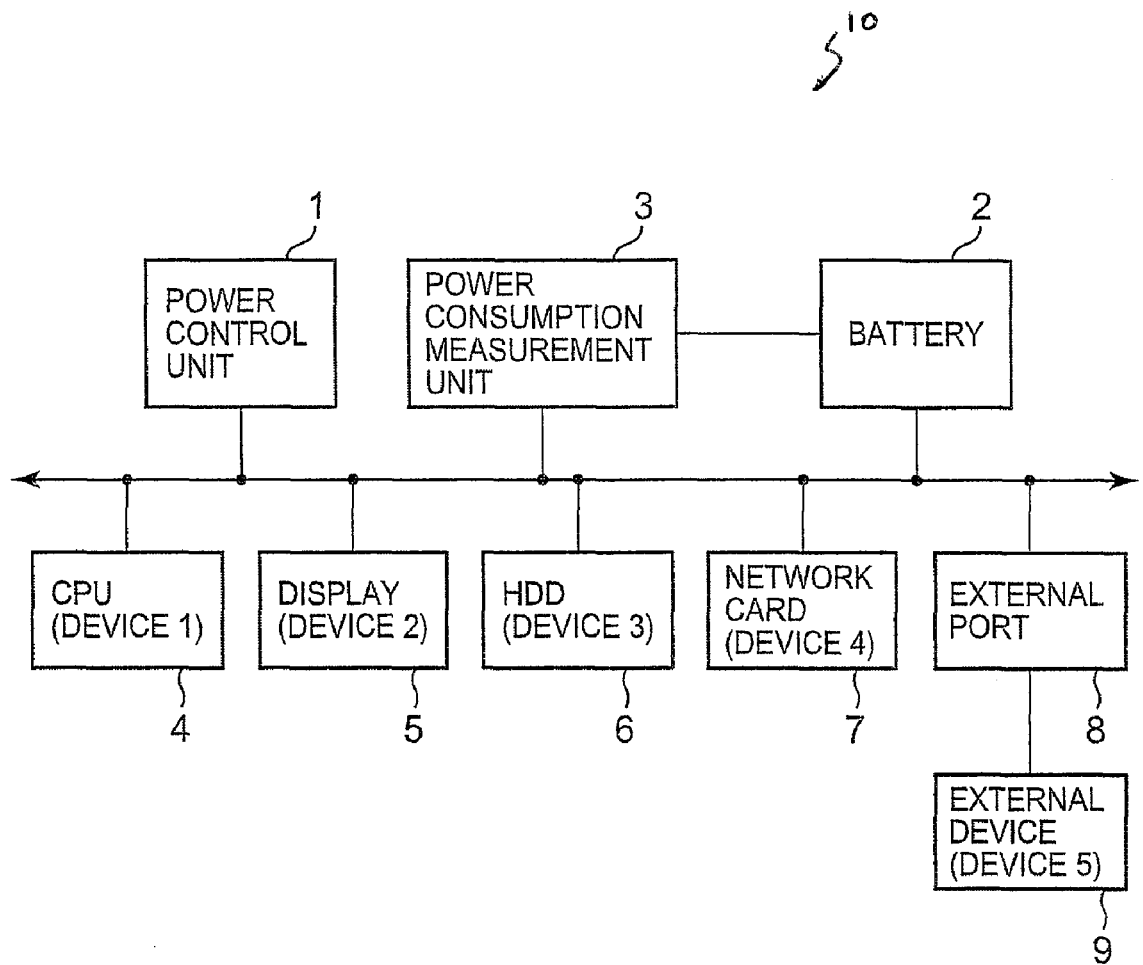
FIG. 1 is a block diagram of an electronic apparatus, in accordance with a preferred embodiment of the present invention.

FIG. 1 is a block diagram of an electronic apparatus capable of being powered by a battery, in accordance with a preferred embodiment of the present invention. As shown, an electronic apparatus 10 includes a power control unit 1, a battery 2, a power consumption measurement unit 3, a central processing unit (CPU) 4 (device 1), a display 5 (device 2), a hard disk drive (HDD) 6 (device 3), a network card 7 (device 4), an external port 8, and an external device 9 (device 5).

The battery 2 supplies electric power to the electronic apparatus 10. The power consumption measurement unit 3 detects a voltage of the battery 2, and measures a remaining battery capacity and total power consumption P of the electronic apparatus 10 based on the detected battery voltage to output a measurement result to the power control unit 1. The CPU 4 (device 1) executes various types of calculation processing to control the units of the electronic apparatus. The display 5 (device 2) displays user information and the like. The HDD 6 (device 3) stores various programs to be executed by the CPU 4. The network card 7 (device 4) executes data communication by radio. The external port 8 is an interface to be connected to the external device 9 (device 5). The battery 2 supplies the electric power to the external device 9 to be connected to the external port 8.

The power control unit 1 can be made of a program module or a hardware module. The power control unit 1 functions as a power consumption estimation unit that periodically monitors the total power consumption P of the electronic apparatus and device information representing the operating states of the devices to estimate the power consumption of each device in real time based on the total power consumption P and the device information of each device. Moreover, the power control unit 1 functions as a power consumption control unit that calculates a range of target power consumption based on the desired operation time of the battery 2 set in response to a user's operation and a remaining battery capacity to control the power state of each device based on the estimated power consumption of each device so that the total power consumption falls in the range of the target power consumption when the detected total power consumption is out of the range of the target power consumption.

In addition, the power control unit 1 functions as a battery usable time presentation unit that calculates an estimated value of the total power consumption in each power mode based on the estimated power consumption of each device and estimates battery usable time in each power mode based on the estimated value of the total power consumption to present the time to a user. Moreover, the power control unit 1 functions as a battery extended time presentation unit that calculates battery extended time in a case where the device or a process is stopped based on the estimated power consumption of the device, to present the battery extended time to the user. For the present disclosure, "the process" is defined as a program or a service.

An estimation method of the power consumption of the devices by the power control unit 1 will be described. The total power consumption P can be represented as the sum of basic power consumption $P_0$ and power consumption $P_D$ of each device D, expressed by equation (A) as follows:

$$P(t) = P_0 + \sum_D P_d(t) \tag{A}$$

The power consumption $P_D$ of each device D can be approximated by equation (1), when an index $I_j$ (the device information representing the operating state of each device) of the device to be monitored is appropriately selected.

$$P_D(t) = P_{D0}\theta_D(t) + \sum_{j \in D} p_j I_j(t) \tag{1}$$

where $P_{D0}$ is power consumption during the idling of the device D, $p_j$ is a proportional coefficient with respect to the index $I_j$, and the following equation results:

$$\theta_D = \begin{cases} 0 & D \text{ is off} \\ 1 & D \text{ is on} \end{cases}$$

When $\theta_D$ is also incorporated as one index into the second term of equation (1), the power consumption $P_D$ of each device D can be represented by equation (B) as follows:

$$P(t) = \sum_{j \in D} p_j I_j(t) \tag{B}$$

Therefore, the total power consumption P can be approximated by equation (2) as follows:

$$P(t) = P_0 + \sum_j p_j I_j(t) \tag{2}$$

In the present embodiment, the total power consumption P and the appropriate index $I_j$ (the device information) with respect to each device are periodically monitored, and all the data from the start of measurement is calculated by a minimum square process to obtain the basic power consumption $P_0$ and a maximum likelihood value of the proportional coefficient $p_j$. Specifically, when a matrix S and a vector T are represented by equations (3) and (4) by the usage of the total power consumption P and the index $I_j$ at time $t_n$, respectively, a proportional coefficient p is obtained as represented by equation (5).

$$S_{jk} = \sum_n I_j(t_n) I_k(t_n) \tag{3}$$

$$T_j = \sum_n P(t_n) I_j(t_n) \tag{4}$$

$$p = S^{-1} T \tag{5}$$

The electric power $P_0$ during the idling can be obtained by setting $I_0(t_n)=1$ (for all n) in equations (3) and (4). When the maximum likelihood value of equation (5) is substituted into the above equation (1) with respect to each device, the estimated time of the power consumption for each device can be calculated in real time.

In addition, the power consumption in an operating situation different from the present situation can be estimated using equation (2). Moreover, even when the external device 9 is newly connected and the power consumption changes, an index concerned with this external device 9 is taken into the matrix S, the vector T and the proportional coefficient $p_j$, whereby the power consumption can subsequently be estimated.

With the present invention, it is assumed that the number of the indexes for use is N, a storage capacity of the order of about $N^2/2$ is required, and summation needs to be performed about $N^2/2$ times for each sampling.

Moreover, for each process that is being performed by the electronic apparatus, the usage of each device, for example, the number of commands from the CPU 4 for use in the process, an input/output data amount or the like is recorded. Such a recorded value is multiplied by the proportional coefficient $p_j$ obtained as described above, whereby the power consumption to be consumed by the process can be estimated.

Figure 2:
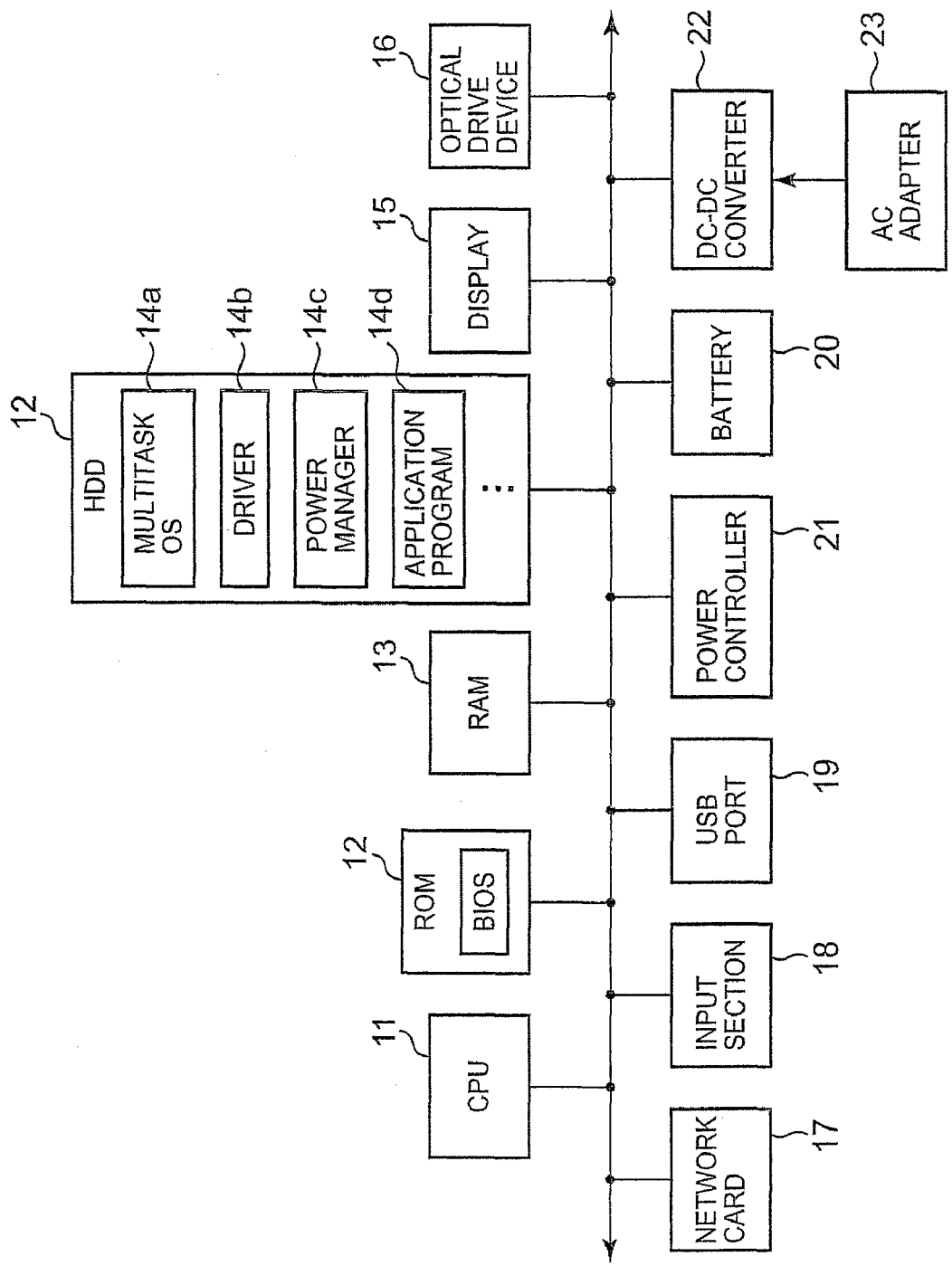
FIG. 2 is a detailed block diagram of the electronic apparatus from FIG. 1, in accordance with a preferred embodiment of the present invention.

FIG. 2 is a detailed block diagram of an electronic apparatus according to Embodiment 1. In Embodiment 1, the electronic apparatus is applied to a battery-driven type notebook-size personal computer. As shown, the electronic apparatus according to Embodiment 1 includes a CPU 11, a read-only memory (ROM) 12, a random access memory (RAM) 13, a HDD 14, a display 15, an optical drive device 16, a network card 17, an input section 18, an universal serial bus (USB) port 19, a battery 20, a power controller 21, a DC-DC converter 22, an AC adapter 23 and the like. These units are connected to one another via a bus.

The CPU 11 has a function of controlling the whole notebook-size personal computer by a multitask OS 14a stored in the HDD 14 connected to the CPU 11 via the bus, and performing processing based on various programs stored in the HDD 14. The ROM 12 stores a BIOS 12a, data and the like. The RAM 13 provides a memory for use as a work area at a time when the CPU 11 executes various programs.

The display 15 includes a liquid crystal display, a backlight, an inverter for driving the backlight, a driver circuit for driving the liquid crystal display, a video controller and the like. The liquid crystal display has a function of displaying a menu, a status, display transition and the like accompanying various types of processing of the CPU 11. The video controller under the control of the CPU 11 controls the inverter to adjust the luminance of the backlight, or sends a video signal to the driver circuit to control the display of the liquid crystal display.

The network card 17 is connected to a network such as internet to perform data communication, or communicates with another apparatus by an infrared ray.

The input section 18 is a user interface for a user to perform an input operation, and includes a keyboard having various keys for inputting characters, commands and the like, and a mouse for moving a cursor on a screen or selecting various menus.

The HDD 14 has a function of storing the multitask OS 14a for controlling the whole notebook-size personal computer, various drivers 14b, a power manager 14c for controlling the power consumption of the notebook-size personal computer during battery driving, various application programs 14d and the like.

The AC adapter 23 is connected to a commercial power source, and converts an AC voltage into a DC voltage to output the voltage to the DC-DC converter 22. The DC-DC converter 22 converts the DC voltage supplied from the AC adapter 23 into a predetermined voltage to supply electric power to each unit, and charges the battery 20. The battery 20 is charged by the DC-DC converter 22, and supplies the charged voltage to each unit. The power controller 21 controls the operations of the battery 20 and the DC-DC converter 22. On receiving a request for the measurement of a remaining battery capacity and a total power consumption P of the battery 20 from the power manager 14c, the power controller 21 measures the remaining battery capacity and the total power consumption of the battery 20 to output the measurement result to the power manager 14c. The battery 20 is used in a case where the AC adapter 23 is not connected to any commercial power source.

A function realized in a case when the CPU 11 reads and executes the power manager 14c stored in the HDD 14 will be described with reference to FIGS. 3 to 5. The CPU 11 executes the power manager 14c to function as a detection unit, a power consumption estimation unit, a desired operation time setting unit, a battery capacity detection unit or a power consumption control unit. In the following description, the function realized by executing the power manager 14c by the CPU 11 will be described in accordance with the power manager 14c as a main operation.

Figure 3:
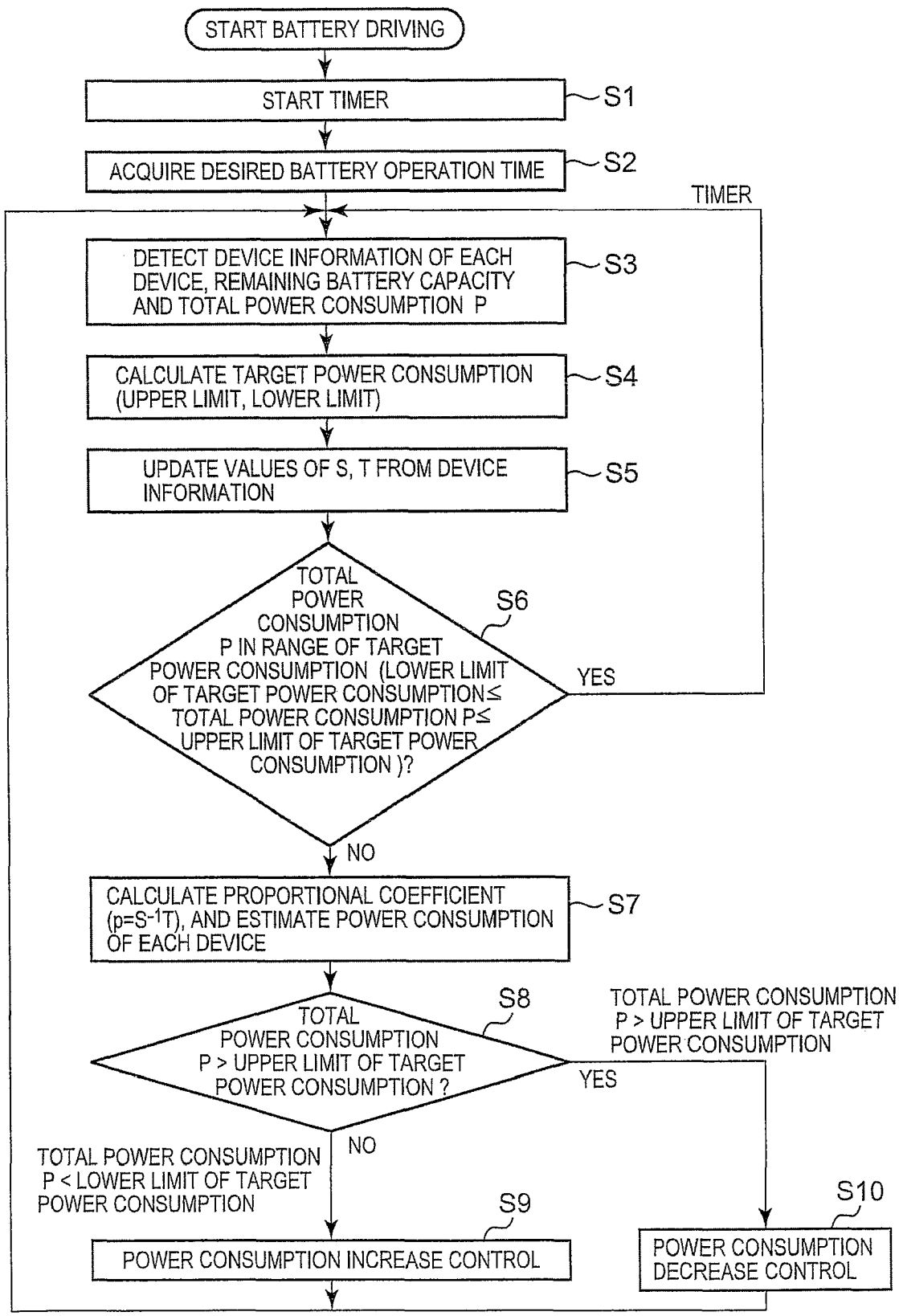
FIG. 3 is a flow chart of a method for managing power, in accordance with a preferred embodiment of the present invention.
Figure 4:
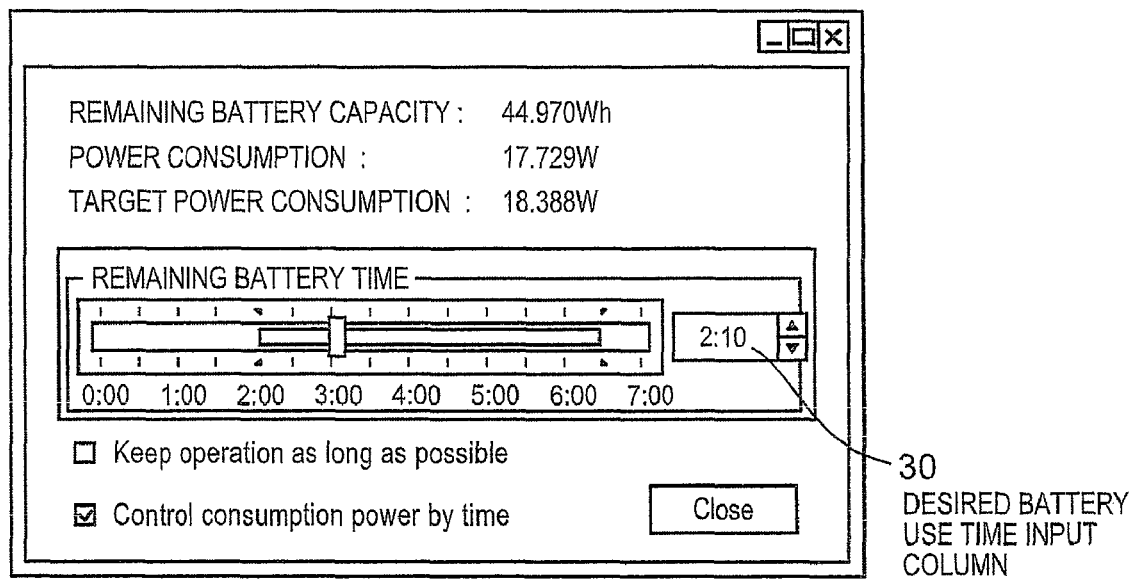
FIG. 4 is a diagram showing one example of a desired battery operation time setting screen.

FIG. 3 is a flow chart of a method performed by the power manager 14c. FIG. 4 is a diagram showing one example of a desired battery operation time setting screen displayed in the display 15 by the power manager 14c. When a button or an icon (not shown) displayed in the disc top of the display 15 is selected, the power manager 14c displays the desired battery operation time setting screen in the display 15. In the desired battery operation time setting screen, as shown in FIG. 4, the present remaining battery capacity, the present power consumption, the target power consumption, remaining battery time, and a desired battery operation time input column 30 are displayed. The user operates the input section 18 to input desired battery operation time in the desired battery operation time input column 30, thereby setting the desired battery operation time. The upper limit of the imputable desired battery operation time is limited by the power consumption in an idle state, and a minimum power has to be secured to such a degree that the user can work without feeling any discomfort. Instead of the inputting by the user, the user's desired battery operation time may be estimated in cooperation with a schedule stored in a notebook-size personal computer.

In FIG. 3, when the driving of the battery is started in accordance with the change (the turning-on of a power source, resume, AC adapter disconnection or the like) of the power source state of the notebook-size personal computer, the power manager 14c starts. Simultaneously with the starting, the power manager 14c starts a timer to collect the device information representing the operating situation of the device and the total power consumption P at constant time intervals (about one to several seconds) (step S1), and the power manager acquires the desired battery operation time (step S2).

When a timer event is generated, the power manager 14c detects the remaining battery capacity and the total power consumption P via the power controller 21, and acquires the device information (a CPU operation frequency, a CPU utilization, an HDD utilization, HDD reading bytes, HDD writing bytes and the like) (step S3).

The power manager 14c determines the upper limit and the lower limit of the target power consumption based on the detected remaining battery capacity and the desired battery operation time (step S4). For example, the upper limit of the target power consumption=(remaining battery capacity−emergency power)/desired battery operation time, and the lower limit of the scheduled power consumption=the upper limit of the scheduled power consumption×95%.

Next, the power manager 14c updates the values of the matrix S and the vector T from the measured value of the device information in accordance with the upper equations (3) and (4) (step S5), and determines whether or not the total power consumption P is in a range of the target power consumption (the lower limit of the target power consumption≦the total power consumption P≦the upper limit of the target power consumption) (step S6). When the total power consumption P is in the range of the target power consumption ("Yes" of step S6), the processing returns to the step S3 to discontinue the operation until the next timer event is generated.

When the total power consumption P is not in the range of the target power consumption ("No" of the step S6), the power manager 14c calculates the proportional coefficient $(p=S^{-1}T)$ for obtaining the estimated power of each device by equation (5), and estimates detailed power consumption concerned with each device, for example, the power consumption per CPU utilization of 1%, the power consumption per HDD utilization of 1%, the power consumption per HDD reading byte and the like with respect to respective device information pieces (step S7).

Subsequently, the power manager 14c determines whether or not the total power consumption P>the upper limit of the target power consumption (step S8), and executes power consumption decrease control (step S10) when it is determined that the total power consumption P>the upper limit of the target power consumption ("Yes" in step S8).

In the power consumption decrease control, for example, the following processing steps (i) to (iv) are performed to decrease the power consumption:

(i) The operating state of the device in which performance can be lowered to control the power consumption is changed (e.g., the adjustment of display luminance, CPU frequency).

(ii) The power of an unused device is stopped. In (i)-(ii), the amount of the power consumption to be decreased by the change of the operating state can be predicted in advance based on the estimated result of the power consumption of each device. Therefore, the devices are selected in order from a device having little influence on the user, until the target power consumption is reached, and then the operating state of the selected device is changed.

(iii) If the target power consumption cannot be achieved even when steps (i)-(ii) are performed, the utilizations of the CPU 11 and the I/O of the process that is being operated are obtained to estimate the power consumption for each process. When the power consumption is large in a background process having little influence on the productivity of the user, for example, a maintenance task, the execution of such a process is temporarily stopped.

(iv) When the target power consumption cannot be achieved even when step (iii) is performed, the utilizations of the CPU 11, the HDD 14, the network card 17 and the like are controlled so as to fall in the range of the target power consumption. The respective utilizations are distributed in accordance with the past history, and can be calculated back from the target power consumption. In this case, a resource is preferentially assigned to the process used by the user in the foreground.

When it is not determined that the total power consumption P>the upper limit of the target power consumption ("No" in the step S8), that is, it is determined that the total power consumption P<the lower limit of the target power consumption, the power manager 14c executes power consumption increase control (step S9). In the power consumption increase control, processing reverse to the above processing steps (i)-(iv) are performed to improve the performance. When the desired battery operation time elapses, or when the AC adapter 23 is connected to the commercial power source to change the driving to AC driving, the power manager 14c stops the operation thereof.

Figure 5:
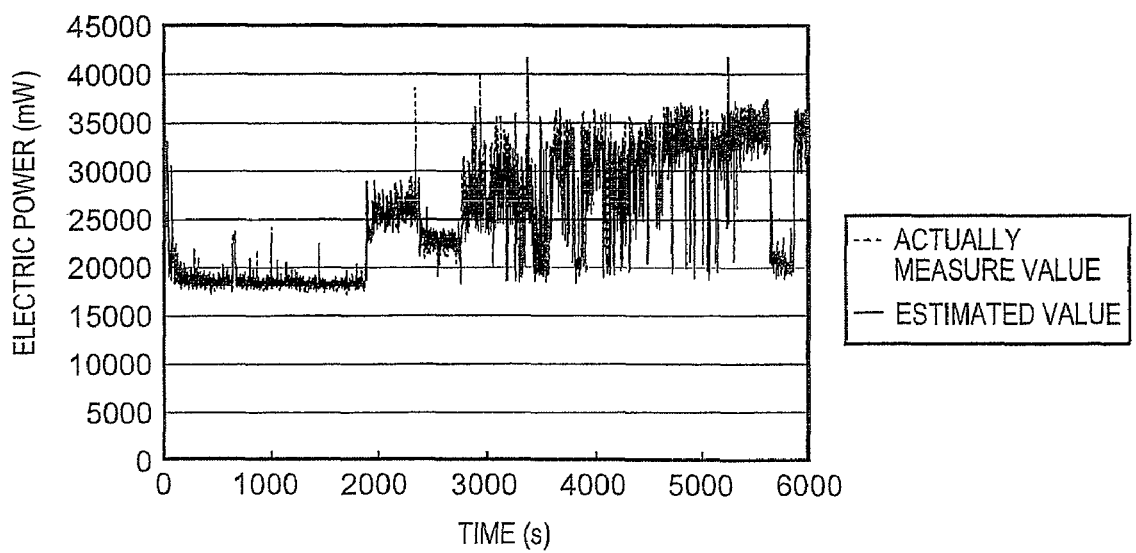
FIG. 5 is a diagram showing an actually measured value and an estimated value of power consumption when an electronic apparatus is operated under battery power.

FIG. 5 shows the actually measured value of the power consumption when the electronic apparatus of the present embodiment is used in a battery driven manner for 6,000 seconds, and an estimated value obtained by a method according to the present invention. In FIG. 5, the abscissa indicates time (s), and the ordinate indicates the power consumption (W). FIG. 5 shows a case when the CPU operation frequency, the CPU utilization, the HDD utilization, HDD reading bytes and HDD writing bytes are used as the device information in estimating the power consumption. The estimated value substantially matches the actually measured value.

Next, a specific calculation example of a method for estimating the power consumption of the device will be described. The total power consumption P is approximated by equation (11), and all the indexes $I_j$ (the device information) and the total power consumption P are repeatedly measured. When the measured value of the total power consumption P acquired at the time $t_n$, the sum of square errors is represented by equation (12).

$$P(t) = \sum_j p_j I_j(t) \tag{11}$$

$$\epsilon = \sum_n (P_n - P(t_n))^2 \tag{12}$$

A combination to minimize equation (12) is supposed to be the maximum likelihood value of the proportional coefficient $p_j$, and equation (13) can be derived from equation (C). When the matrix S and the vector T are represented by equations (14), (15), a set of proportional coefficients p can be obtained by equation (16).

$$\frac{\partial \epsilon}{\partial p_j} = -2 \sum_n \left\{ P_n - \sum_k p_k I_k(t_n) \right\} I_j(t_n) = 0 \tag{C}$$

$$\sum_n P_n I_k(t_n) = \sum_j p_j \left( \sum_n I_j(t_n) I_k(t_n) \right) \tag{13}$$

$$S = \begin{pmatrix} \sum_n I_0(t_n) I_0(t_n) & \cdots & \sum_n I_0(t_n) I_k(t_n) \\ \vdots & & \vdots \\ \sum_n I_k(t_n) I_0(t_n) & \cdots & \sum_n I_k(t_n) I_k(t_n) \end{pmatrix} \tag{14}$$

$$T = \begin{pmatrix} \sum_n P_n I_0(t_n) \\ \sum_n P_n I_1(t_n) \\ \vdots \\ \sum_n P_n I_k(t_n) \end{pmatrix}, \quad p = \begin{pmatrix} p_0 \\ p_1 \\ \vdots \\ p_k \end{pmatrix} \tag{15}$$

$$p = S^{-1} T \tag{16}$$

To simplify the description, a system having three parts, such as the CPU 11, the display 15 and the hard disk (HDD) 14, is utilized. The CPU 11 has two operation frequencies $f_0$, $f_1$ at low and high speeds, and consumes electric powers different from each other in accordance with the respective operation frequencies, and the sum of the electric power during the idling and the electric power proportional to the utilization can be approximated with respect to the respective operation frequencies $f_0$, $f_1$.

In the display 15, a backlight can be adjusted in two stages, that is, bright and dark stages, and a substantially constant electric power $P^0_{Display}$ or $P^1_{Display}$ is consumed in each mode. The HDD 14 can consume the electric power in proportion to the utilization time ratio, the amount of data to be written and the amount of data to be read, respectively, in addition to the electric power during the idling.

At this time, the total power consumption P, power consumption $P_{CPU}$ of the CPU 11, power consumption $P_{Display}$ of the display 15 and power consumption $P_{HDD}$ of the HDD 14 can be represented by equation (17).

$$P = P_{CPU} + P_{Display} + P_{HDD} \tag{17}$$

$$p_{CPU} = \begin{cases} P^0_{CPU} + p^0_{CPU} U_{CPU} & f = f_0 \\ P^1_{CPU} + p^1_{CPU} U_{CPU} & f = f_1 \end{cases}$$

$$p_{Display} = \begin{cases} P^0_{Display} & \text{Dark} \\ P^1_{Display} & \text{Bright} \end{cases}$$

$$P_{HDD} = P^0_{HDD} + u U_{HDD} + rW + wW$$

where $P_{iCPU}$: the power consumption during an idling operation at a frequency $f_i$;
$U_{CPU}$: the CPU utilization;
$P^i_{CPU}$: the proportional coefficient of the utilization with respect to the power consumption:
$U_{HDD}$: the utilization time ratio of the HDD;
W: the amount of the data to be written;
R: the amount of the data to be read; and
u, w and r: the proportional coefficients.

When equation (17) is adapted to the format of equation (11), the following equation (18) can be represented.

$$p_0 = P^0_{CPU} \quad I_0 = \begin{cases} 0 & f = f_0 \\ 1 & f = f_1 \end{cases} \tag{18}$$

-continued $$p_1 = P^0_{CPU} \quad I_1 = \begin{cases} U_{CPU} & f = f_0 \\ 1 & f = f_1 \end{cases}$$

$$p_2 = P^1_{CPU} \quad I_2 = \begin{cases} 0 & f = f_0 \\ 1 & f = f_1 \end{cases}$$

$$p_3 = P^1_{CPU} \quad I_3 = \begin{cases} 0 & f = f_0 \\ U_{CPU} & f = f_1 \end{cases}$$

$$p_4 = P^0_{Display} \quad I_4 = \begin{cases} 1 & \text{Dark} \\ 0 & \text{Bright} \end{cases}$$

$$p_5 = P^1_{Display} \quad I_5 = \begin{cases} 0 & \text{Dark} \\ 1 & \text{Bright} \end{cases}$$

$$p_6 = P^0_{HDD} \quad I_6 = 1$$

$$p_7 = u \quad I_7 = U_{HDD}$$

$$p_8 = w \quad I_8 = W$$

$$p_9 = r \quad I_9 = R$$

The frequency and the utilization of the CPU 11, the luminance of the display 15, the utilization, the amount of data to be written and the amount of the data to be read in the HDD 14, and the total power consumption P (Power) are periodically measured, and the measurement results shown in Table I can be obtained.

TABLE I

| CPU | | | HDD | | |
|---|---|---|---|---|---|
| Frequency | Utilization (%) | Display Luminance | Utilization (%) | Amount of data to be written (MB) | Amount of data to be read (MB) | Power (mW) |

| Frequency | Utilization (%) | Display Luminance | Utilization (%) | Amount of data to be written (MB) | Amount of data to be read (MB) | Power (mW) |
|---|---|---|---|---|---|---|
| Low | 22 | Dark | 54 | 0.71 | 3.92 | 4209 |
| Low | 18 | Dark | 47 | 0.34 | 0.01 | 3378 |
| Low | 10 | Dark | 53 | 0.06 | 1.02 | 3269 |
| Low | 41 | Dark | 25 | 1.94 | 0.01 | 4015 |
| Low | 67 | Dark | 27 | 6.89 | 0.01 | 5977 |
| High | 11 | Dark | 26 | 0.70 | 0.04 | 5239 |
| High | 82 | Dark | 5 | 0.20 | 0.05 | 9983 |
| Low | 64 | Dark | 74 | 0.01 | 2.38 | 4941 |
| High | 18 | Dark | 3 | 0.01 | 0.59 | 5419 |
| High | 96 | Dark | 78 | 0.16 | 3.93 | 12201 |
| Low | 19 | Dark | 23 | 0.02 | 0.42 | 2973 |
| High | 33 | Bright | 82 | 0.01 | 1.90 | 6291 |
| High | 41 | Bright | 37 | 0.27 | 0.05 | 9412 |
| Low | 84 | Bright | 26 | 0.04 | 0.01 | 12288 |
| Low | 96 | Bright | 79 | 0.01 | 5.36 | 8341 |
| High | 74 | Bright | 4 | 0.27 | 0.15 | 11300 |
| High | 3 | Bright | 93 | 0.04 | 0.04 | 7584 |
| Low | 95 | Bright | 99 | 5.47 | 0.64 | 8609 |
| High | 100 | Bright | 20 | 0.10 | 0.50 | 13345 |
| High | 8 | Bright | 59 | 1.66 | 0.50 | 7685 |
| High | 10 | Bright | 77 | 0.20 | 0.12 | 7631 |
| High | 71 | Bright | 19 | 0.01 | 4.00 | 12339 |
| Low | 39 | Bright | 81 | 0.22 | 6.92 | 7768 |
| High | 44 | Bright | 29 | 0.20 | 0.01 | 9570 |
| Low | 37 | Bright | 97 | 4.03 | 3.19 | 7509 |
| Low | 56 | Bright | 3 | 1.05 | 5.27 | 7211 |

The measurement results shown above in Table I are substituted into equations (14) to (16) to obtain solutions as follows:

$P^0_{CPU}$=8.15 W, $p^0_{CPU}$=24.7 mW/%

$P^1_{CPU}$=9.95 W, $p^1_{CPU}$=69.8 mW/%

$P^0_{Display}$=8.22 W, $p^1_{Display}$=10.24 W $P^0_{HDD}$=−14.06 W, $u$=9.87 mW/%, $r$=152 mW/MB $w$=247 mW/MB A correlation between the predicted value and the actually measured value using these coefficients is a considerably high value of 99.97%, and the whole model validity is confirmed. On the other hand, as seen from $P^0_{HDD}$ of a negative value, non-fluctuation components $P^0_{CPU}$, $P^1_{CPU}$, $P^0_{Display}$, $P^1_{Display}$ and $P^0_{HDD}$ have results that do not have any reliability. In actual, the standard error of P0HDD is much larger than the result, is and as to the other values, any standard error cannot be calculated. This indicates that the non-fluctuation components cannot be separated. When data is classified for the same non-fluctuation component and the estimated values are separately obtained, such uncertainty can be eliminated. In the above case, the data is classified into four states, that is, (1) low speed CPU-dark backlight, (2) high speed CPU-dark backlight, (3) low speed CPU-bright backlight and (4) high speed CPU-bright backlight. The calculation results are obtained as follows.

(1) Low Speed CPU-Dark Backlight $P^0_{CPU}+P^0_{Display}+P^0_{HDD}$=2.21 W, $p^0_{CPU}$=21.7 mW/%

$u$=13.4 mW/%, $r$=146 mW/MB, $w$=284 mW/MB (2) High Speed CPU-Dark Backlight
Lack of data (3) Low Speed CPU-Bright Backlight $P^0_{CPU}+P^1_{Display}+P^0_{HDD}$=4.45 W, $p^0_{CPU}$=25.7 mW/%

$u$=9.24 mW/%, $r$=125 mW/MB, $w$=222 mW/MB (4) High Speed CPU-Bright Backlight $P^1_{CPU}+P^1_{Display}+P^0_{HDD}$=6.21 W, $p^1_{CPU}$=68.5 mW/%

$u$=9.02 mW/%, $r$=154 mW/MB, $w$=271 mW/MB

When the data is beforehand classified for each system state and calculated in this manner, a calculation amount can largely be decreased. In the first calculation, 10×10 ten symmetric matrix elements need to be obtained to obtain ten unknown quantities, and 55 product sum operations are required for acquiring each data. In the calculation after the classification, the non-fluctuation components added up to obtain five unknown quantities. Therefore, the number of the calculating operations is sufficiently 15. The non-fluctuation components cannot be separated, but idling power in each state is obtained, and hence any practical problem is not generated.

On the other hand, the number of the data after classified decreases, and hence error increases. In actual, in the above example, there are fluctuations in the values of u, r and w in the above states (1), (3) and (4). Moreover, in the state (2), only four data are given with respect to five unknown quantities. Therefore, even the estimated value is not obtained. However, in an actual operation, much more measurement operations are performed in real time, and hence the error is sufficiently converged and decreases.

As described above, according to Embodiment 1, the power manager 14c periodically detects the total power consumption of the apparatus and the device information representing each device operating state, and estimates the power consumption of each device in real time based on the detected total power consumption of the apparatus and the device information of each device. Therefore, in the battery-driven type electronic apparatus, the power consumption of each device constituting the electronic apparatus can be estimated with high accuracy. Additionally, even when the power consumption largely fluctuates in accordance with the additional installation of devices or the change of use cases, quantitative power control can be performed by accurately estimating the power consumption of each device from its power state and utilization.

Moreover, according to Embodiment 1, when the total power consumption is P, the power consumption of each device during the idling is $P_0$, the device information is $I_j$, and the proportional coefficient with respect to the device information $I_j$ is $p_j$, the total power consumption P can be approximated by the above equation (2). Therefore, the power consumption of each device can be estimated by simple calculation.

Furthermore, according to Embodiment 1, the power manager 14c calculates the range of the target power consumption based on the desired operation time of the battery 20 set by the user and the remaining battery capacity. When the total power consumption P is out of the range of the target power consumption, the operating state of each device is controlled based on the estimated power consumption of each device so that the total power consumption P is in the range of the target power consumption. Therefore, even when the power consumption largely fluctuates in accordance with the additional installation of the device and the use situation, dynamic power control can quantitatively be performed. Additionally, in Embodiment 1, the power consumption of the device is estimated in real time. Therefore, when the performance and the amount of the operation to be executed are dynamically changed, the best performance can be provided in accordance with the battery driving time required for the user. Moreover, the shortage of the electric power due to rapid power control can be compensated by temporary discontinuation or delaying of the process that is being executed, limitation of an access to a device that consumes large electric power and the like. On the other hand, when the target power consumption is below the actual power consumption, surplus power can be used for improving the performance of the system.

In Embodiment 1, when the measured total power consumption P is not in the range of the target power consumption, the power manager 14 automatically controls the power consumption so that the total power consumption P falls in the range of the target power consumption. On the other hand, in Embodiment 2, the power manager 14c presents, to a user, battery usable time for each power mode and power consumption for each device or process, to facilitate user's setting of the power consumption during the use of a battery.

In Embodiment 2, a CPU 11 executes the power manager 14c to function as a battery usable time presentation unit, a first battery extended time presentation unit or a second battery extended time presentation unit. In Embodiment 2, when the driving of the battery is started, in the same manner as in Embodiment 1, the power manager 14c starts a timer, collects device information and total power consumption P at constant time intervals, substitutes the measured values of the device information and the total power consumption P into the above equations (2), (3) to calculate matrix S and vector T in real time, and estimates a proportional coefficient ($p=S^{-1}T$) and the power consumption of each device.

Figure 6:
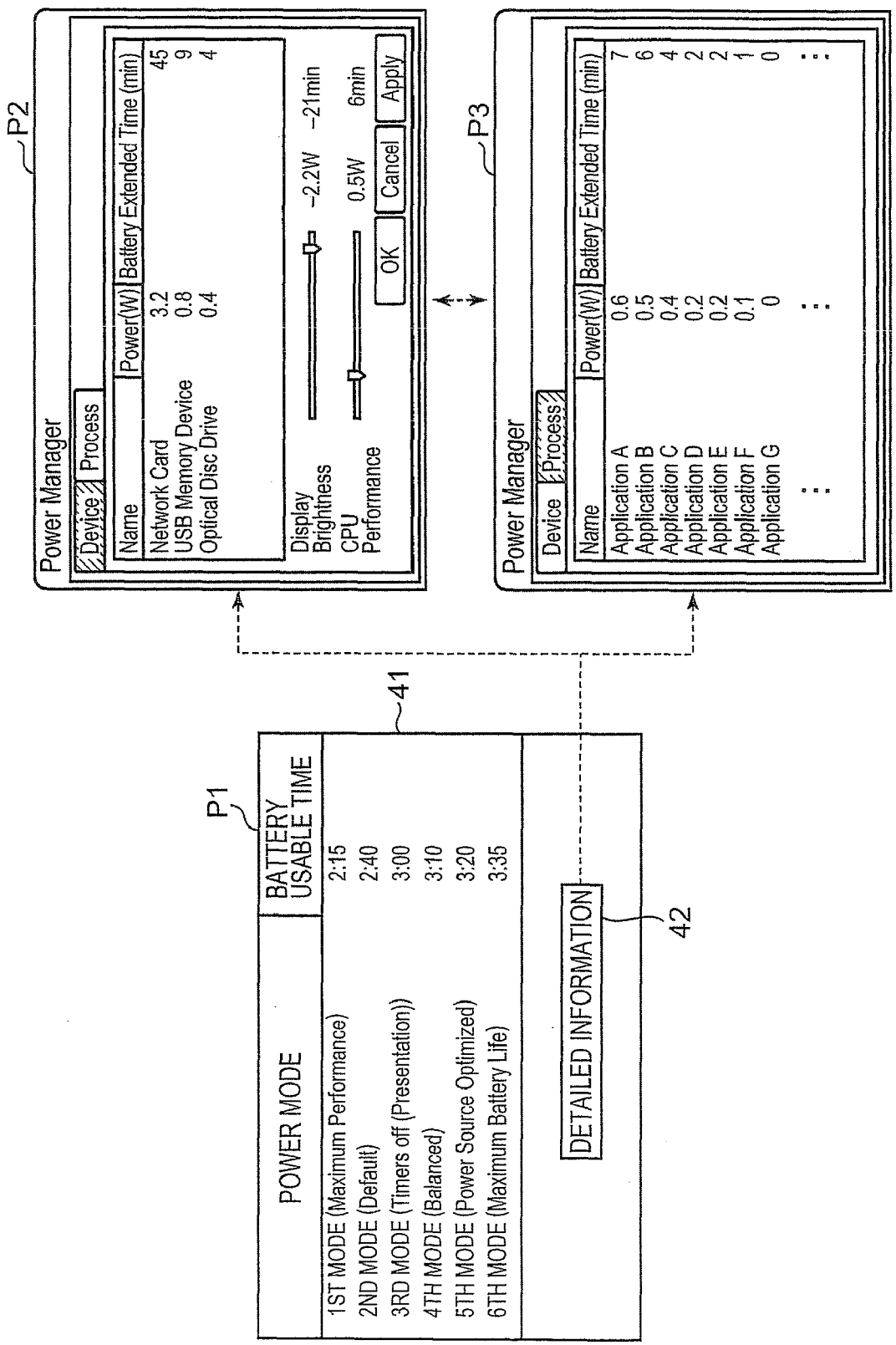
FIG. 6 is a diagram showing one example of a power mode selection screen and a device power consumption screen.

FIG. 6 is a diagram showing one example of a power mode (profile) selection screen and a device-process power consumption screen. In a desk top of a display screen of a display 15, a button (not shown) or an icon (R) (not shown) for changing a power state is displayed. When a user intends to lengthen battery driving time or is dissatisfied with the performance of a personal computer, the user operates an input section 18 to select this button or icon (R). Then, the power manager 14c displays a power mode selection screen P1. The power mode selection screen P1 displays a battery usable time (a predicted value) list 41 in power modes (first to sixth modes) and a detailed information button 42 for displaying the device-process power consumption screen. For example, the battery usable time (the predicted value) when the sixth mode (Maximum Battery Life) is selected is 3.35 h.

The user can select the power mode in this list 41. The power manager 14c applies the present use situation (device information, the estimated value of the power consumption of each device) to the device setting defined in each power mode to obtain the predicted value of the total power consumption in each power mode, estimates the battery usable time, and displays, in the list 41, the battery usable time (the predicted value) in each power mode (the first to sixth modes). In consequence, the user can select the power mode in consideration of the battery usable time.

When the detailed information button 42 is selected, the device(process power consumption screen is displayed. In the device(process power consumption screen, the display of the device or the process can be switched with a selection button. When the device is selected, a device(process power consumption screen P2 is displayed. When the process is selected, a device(process power consumption screen P3 is displayed.

The device-process power consumption screen P2 displays the estimated power consumption of a detachable/attachable device(=a device in which power supply can be stopped) and the battery life in a case where the device is detached or attached. The power manager 14c calculates the battery life after the detachment of the device based on the current status (the device usage and the estimated power consumption) of the detachable/attachable device. For example, in the example shown in the drawing, when the network card 17 is detached or attached, power consumption of 3.2 W can be saved, and the battery life can be extended as much as 45 minutes. Moreover, in the device (process power consumption screen P2, the power manager 14c displays the changes of the power consumption and the battery life due to the changes of the settings of the luminance of the backlight of the display 15, the performance of the CPU 11 and the like. When the user moves the slider, the luminance of the backlight of the display 15 and the performance of the CPU 11 can be set.

The device-process power consumption screen P3 displays the power consumption due to the execution of processes and the battery life after stopping the process. The power manager 14c monitors device usages for each process, and calculates and displays the estimated power consumption and the battery life extendable at a time when the process is stopped. For example, when Application B is stopped, the 3.2 W of power can be saved, and the battery life can be extended as much as 45 minutes.

Thus, when the device-process power consumption screens P2, P3 are presented to the user, the user can set the performance in accordance with the necessary battery life. For example, to extend the battery life, an unnecessary device is removed, and the performance of the CPU 11 and the luminance of the backlight of the display 15 are lowered, or the unnecessary process is stopped, whereby the power consumption can be decreased.

As described above, according to Embodiment 2, the power manager 14c predicts the total power consumption and estimates battery life in each power mode based on the power estimation of each device and displays them in the display screen. Hence, the criterion for the user to select the power mode is clarified.

Moreover, according to Embodiment 2, the power manager 14c calculates the battery extended time in a case where the power supply to the device is stopped based on the estimated power consumption of the device, to display the time in the display screen. Therefore, the user can remove the device that consumes large power, to save unnecessary power.

Furthermore, according to Embodiment 2, the power manager 14c monitors the device usages in each process, and calculates the battery extended time extendable at a time when each process is stopped based on the power estimation of each device to display the time in the display screen. Therefore, the user can stop the process that consumes large power, to avoid the unnecessary power consumption.

As has been described, the present invention provides a method and apparatus for controlling power in a battery-powered electronic device.

It is also important to note that although the present invention has been described in the context of a fully functional system, those skilled in the art will appreciate that the mechanisms of the present invention are capable of being distributed as a computer program product.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
a battery for supplying electric power to each device within said electronic apparatus;
a detection unit for periodically detecting total power consumption of said electronic apparatus and device information representing an operating state of said each device within said electronic apparatus; and
a power consumption estimation unit for estimating power consumption of said each device based on said detected total power consumption and said detected device information of said each device, wherein said power consumption is approximated by $$P(t) = P_0 + \sum_j p_j I_j(t)$$

where P is the total power consumption, $P_0$ is power consumption of each device during idling, $I_j$ is device information, and $p_j$ is a proportional coefficient with respect to said device information $I_j$.

2. The electronic apparatus of claim 1, further comprising:
a desired operation time setting unit for setting a desired operation time of said battery in response to a user's operation;
a remaining battery capacity detection unit for detecting the remaining capacity of said battery; and
a power consumption control unit for determining a range of target power consumption based on the desired operation time of said battery set by the desired operation time setting unit and said remaining battery capacity detected by said battery capacity detection unit to control the operating state of each device based on said power consumption of each device estimated by said power consumption estimation unit so that the total power consumption falls in the range of a target power consumption when said total power consumption detected by said detection unit is out of the range of said target power consumption.

3. The electronic apparatus of claim 1, further comprising:
a battery usable time presentation unit for determining an estimated value of said total power consumption in each power mode based on the power consumption of each device estimated by said power consumption estimation unit and that estimates battery usable time in each power mode based on the estimated value of said total power consumption to display the time in a display screen.

4. The electronic apparatus of claim 1, further comprising:
a first battery extended time presentation unit that calculates battery extended time when the supply of the electric power to the device is stopped based on the power consumption of the device estimated by said power consumption estimation unit, to display the battery extended time in a display screen.

5. The electronic apparatus of claim 1, further comprising:
a second battery extended time presentation unit that monitors a use situation of the device with respect to each process and that calculates the battery extended time extendable when each process is stopped based on the power consumption of the device estimated by said power consumption estimation unit, to display the battery extended time in a display screen.

6. A method comprising:
supplying electric power to each device within said electronic apparatus by a battery;
periodically detecting total power consumption of said electronic apparatus and device information representing an operating state of each device; and
estimating power consumption of each device based on said total power consumption of said electronic apparatus and said detected device information of each device by $$P(t) = P_0 + \sum_j p_j I_j(t)$$

where P is the total power consumption, $P_0$ is power consumption of each device during idling, $I_j$ is device information, and $p_j$ is a proportional coefficient with respect to said device information $I_j$.

* * * * *